United States Patent
Boissier et al.

[11] 3,719,679
[45] March 6, 1973

[54] 9-(1-PIPERAZINYL)-9,10-DIHYDRO-9,10-ETHANOANTHRACENES AND THEIR SALTS

[75] Inventors: Jacques Robert Boissier, Paris; Roger Ratouis, Saint-Cloud, both of France

[73] Assignee: Societe anonyme dite: Societe Industrielle pour la Fabrication des Antibiotques (S.I.F.A.), Puteaux, France

[22] Filed: Aug. 20, 1971

[21] Appl. No.: 173,685

Related U.S. Application Data

[63] Continuation of Ser. No. 730,650, May 20, 1968, abandoned.

[30] Foreign Application Priority Data

June 8, 1967 France.............................67109575
Sept. 6, 1967 France.............................67120105

[52] U.S. Cl....260/268 PC, 260/240 K, 260/268 TR, 260/649 R, 424/250, 260/268 C
[51] Int. Cl. ............................................C07d 51/70
[58] Field of Search...................260/268 PC, 268 TR

[56] References Cited

UNITED STATES PATENTS

| | | | |
|---|---|---|---|
| 2,673,874 | 3/1954 | Jenkins | 260/268 PC |
| 3,257,404 | 6/1966 | Fouche | 260/268 TR |
| 3,399,201 | 8/1968 | Schmidt | 260/268 PC |
| 3,422,106 | 1/1969 | Boissier et al. | 260/268 PC |
| 3,459,745 | 8/1969 | Fouche | 260/268 TR |
| 3,576,000 | 4/1971 | Boissier | 260/268 PC |

*Primary Examiner*—Donald G. Daus
*Attorney*—Davis, Hoxie, Faithfull & Hapgood

[57] ABSTRACT

The compounds are new 9-(1-piperazinyl)-9,10-dihydro-9,10-ethanoanthracenes and their acid addition and quaternary ammonium salts; they correspond to the formula:

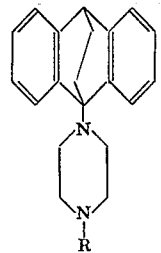

(1)

R : hydrogen atom, lower alkyl, lower hydroxyalkyl, lower alkoxycarbonyl or lower hydroxyalkoxyalkyl radical or —X—Ar radical (X : lower alkylene radical — Ar : phenyl radical eventually substituted by halogen atoms, lower alkyl or lower alkoxy radicals).

They are very useful substances for human therapeutics, namely as antihistaminics and antianaphylactics. Processes for the preparation of compounds of formula 1.

2 Claims, No Drawings

9-(1-PIPERAZINYL)-9,10-DIHYDRO-9,10-ETHANOANTHRACENES AND THEIR SALTS

This is a continuation of application Ser. No. 730,650, May 20, 1968, now abandoned.

This invention relates to new 9-(1-piperazinyl)-9,10-dihydro-9,10-ethanoanthracenes and their acid addition and quaternary ammonium salts and to the process for preparation thereof. The products according to the invention have proved to be very useful in human therapeutics namely as antihistaminics and antianaphylactics.

The new 9-(1-piperazinyl)-9,10-dihydro-9,10-ethanoanthracenes according to the invention are represented by the general formula:

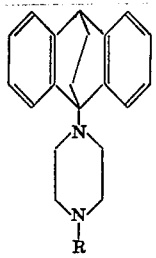

(1)

wherein R represents an hydrogen atom or a lower alkyl, lower hydroxyalkyl, lower alkoxycarbonyl or lower hydroxyalkoxyalkyl radical or a —X—Ar radical in which X is a lower saturated or not, straight or branched alkylene radical, and Ar is a phenyl radical eventually substituted by halogen atoms or lower alkyl or lower alkoxy radicals.

The terms lower alkyl, lower hydroxyalkyl, lower alkoxycarbonyl, lower hydroxyalkoxyalkyl, lower alkylene or lower alkoxy are intended to designate radicals containing not more than six carbon atoms.

According to the present invention 9-(1-piperazinyl)-9,10-dihydro-9,10-ethanoanthracenes of formula 1 are prepared by reacting 9,10-dibromo-9,10-dihydro-anthracene with a piperazine of formula:

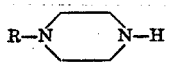

(2)

in which R has the meaning herein before defined, in the presence of an hydrogen bromide-binding alkaline agent, then reacting the compound of formula:

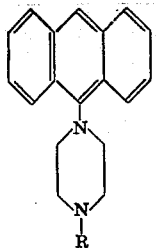

(3)

thus obtained, in which R has the meaning cited before, with ethylene under pressure, while heating and within a solvent, and isolating the obtained compound of formula 1.

The preferred conditions for carrying out the process are as follows:

a. 9,10-dibromo-9,10-dihydro-anthracene is added to an equimolecular quantity of piperazine of formula 2 and to twice the equimolecular quantity of an alkaline agent in a solvent. The said agent may be a tertiary organic base such as triethylamine. The alkaline agent may be as well piperazine of formula 2 itself; then three times the equimolecular amount of piperazine in respect with the amount of the 9,10-dibromo-9,10-dihydro-anthracene are used. The solvent may be an organic inert solvent as an halogenated derivative of aliphatic hydrocarbons, an aromatic hydrocarbon or carbon disulphide. The obtained compound of formula 3 is then isolated.

b. compound of formula 3 is reacted with ethylene, preferentially over a pressure range of about 30 kg/cm2 to about 200 kg/cm2 and over a temperature range of about 150° C to about 250° C, within a solvent such as an aromatic hydrocarbon. The products are kept in contact for several hours, for instance from 10 to 60 hours. When the reaction is over, the obtained compound of formula 1 is isolated.

When the process described herein before in a has been effected within an aromatic hydrocarbon, the compound of formula 3 may be reacted directly with ethylene without isolating said compound from the reaction medium where it was prepared. The reaction with ethylene is then preferentially performed in the conditions described above in b.

The above defined process enables to obtain very easily compounds of formula 1 in which R represents a lower alkoxycarbonyl. Therefore such compounds can be used advantageously as intermediates to give compounds of formula 1 in which R is not a lower alkoxycarbonyl. According to the invention the latter compounds can be prepared following an alternative method of the process above described, which comprises first preparing a compound of formula 1 in which R is a lower alkoxycarbonyl radical, then hydrolyzing this compound by usual means to give 9-(1-piperazinyl)-9,10-dihydro-9,10-ethanoanthracene of formula:

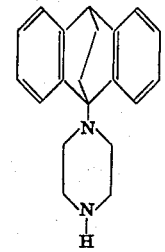

(4)

and eventually treating compound of formula 4 by an halide of formula:

$$Hal — R_1 \qquad 5$$

in which $R_1$ may represent all the possible meanings of R except hydrogen and lower alkoxycarbonyl, and Hal represents a chlorine, bromine or iodine atom.

The process of this alternative method is carried out preferably as follows:

a. a 9-(4-alkoxycarbonyl-1-piperazinyl)-9,10-dihydro-9,10-ethanoanthracene is hydrolyzed by acid or alkaline aqueous or alcoholic solutions such as hydrochloric acid, or sodium hydroxide, or potassium hydroxide solutions in water, methanol, ethanol, butanol, ethylene glycol at the boiling temperature of the reaction medium during several hours. This reaction is advantageously carried out by two successive hydrolysis, one in alkaline medium, the other in acidic medium. 9-(1-piperazinyl)-9,10-dihydro-9,10-ethanoanthracene is then isolated by usual means.

b. eventually a compound of formula 5 is reacted with the compound of formula 4, in presence of an hydrogen halide-binding alkaline agent. The alkaline agent may be piperazine of formula 4 itself, or an alkaline hydroxide. The reaction is advantageously carried out in a solvent as an aromatic hydrocarbon, at the boiling temperature of the reaction medium. At the completion of the reaction the desired compound is isolated by usual means.

Products of formula 1 in which R represents a lower alkyl radical or a —X—Ar radical, X and Ar having the meaning mentioned above, may also be prepared by reacting 9-bromoanthracene with a lithium derivative of formula :

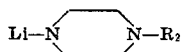
(6)

in which $R_2$ represents a lower alkyl radical or a —X—Ar radical, X and Ar having the meaning above indicated, then treating the obtained derivative of formula :

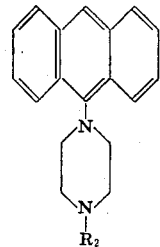
(7)

by ethylene, following the conditions described in the first process, and isolating the desired product.

Preferably the lithium derivative of formula 6 is prepared by reacting an alkyllithium or an aryllithium (such as butyllithium or phenyllithium) with a mono substituted piperazine of formula :

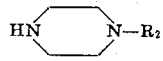
(8)

in which $R_2$ has the meaning mentioned before, within an anhydrous solvent as ether or benzene ; 9-bromoanthracene is reacted advan-tageously with a lithium derivative of formula 6 at the boiling temperature of the reaction medium. When the reaction is over, the obtained compound of formula 7 is isolated by usual means.

9-(1-piperazinyl)-9,10-dihydro-9,10-ethanoanthracenes of formula (1) have a basic character and according to the invention their acid addition salts may be prepared by reacting mineral or organic acids with said 9-(1-piperazinyl)-9,10-dihydro-9,10-ethanoanthracenes, preferably in the presence of a solvent. Preference is given to anhydrous solvents such as, for instance, benzene, ethyl ether, ethanol, acetone. According to the invention, quaternary ammonium salts may be prepared by reacting quaternizing agents with said 9-(1-piperazinyl)-9,10-dihydro-9,10-ethanoanthracenes, preferably in the presence of a solvent. Preference is given to anhydrous solvents such as for instance ethyl ether, methyl cyanide, acetone, dioxane, methanol, ethanol. The salts can eventually be prepared without isolating the compound of formula (1) from the reaction medium where it was obtained.

9-(1-piperazinyl)-9,10-dihydro-9,10-ethanoanthracenes of formula (1) and their salts are very useful substances for human therapeutic, namely by their remarkable antihistaminic and antianaphylactic properties.

Their toxicological and pharmacological investigations have shown their great activity and outstanding interest.

The results obtained in toxicological field (lethal doses 50) and from antihistaminic activity studies have been summarized in the under mentioned table, where are shown :

a. — lethal doses 50 determined in mice by intraperitoneal route.

b — average inhibitory concentrations 50 (I.C.50) determinated on guinea-pig isolated ileum, according to Magnus's technique, expressing the antagonistic action of compounds against the contracturing action of histamine and acetylcholine.

c — the numbers of unitary lethal doses of histamine antagonized in guinea-pig by subcutaneous administration of 20 mg/kg of the tested compound ; the unitary lethal dose of histamine used in the ex-

TABLE

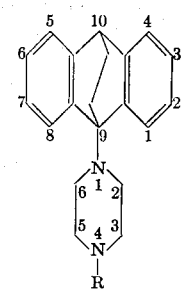

| Example No. | R | Form | L.D. 50 i.p. mice, mg./kg. | I.C. 50 guinea-pig isolated ileum | | Antihistaminic activity in vivo | |
|---|---|---|---|---|---|---|---|
| | | | | Histamine | Acetylcholine | Number of unitary lethal doses of histamine | E.D. 50, mg./kg. |
| 4 | $CH_3$ | HCl | 120 | $10^{-8}$ | $2.10^{-6}$ | 800 | 0.05 |
| 5 | $CH_3$ | HCl | 158 | $10^{-9}$ | $10^{-6}$ | 1,000 | 0.006–0.012 |
| 8 | $CH_2CH_2OH$ | HCl | 187 | $2.10^{-8}$ | $10^{-5}$ | 600–800 | 0.2–0.5 |
| 9 | $CO_2C_2H_5$ | Base | >500 | $5.10^{-7}$ | $>10^{-4}$ | <200 | >0.1 |
| 12 | H | HCl | 69 | $2.10^{-8}$ | $5.10^{-6}$ | <200 | 0.2–0.5 |
| 13 | $CH_2CH=CH—\langle\rangle$ | Base | >500 | $>10^{-4}$ | $>10^{-4}$ | <200 | 0.5–1 | perimentation was 0,8 mg/kg of histamine dihydrochloride administered by intravenous route, 30 minutes after the tested compound. The number of unitary lethal doses of histamine antagonized by a compound showed the antihistaminic activity in vivo.

d — the protective efficient doses 50 (E.D. 50) of compounds against a dose of 0,8 mg/kg of histamine dihydrochloride administered by intravenous route in guinea-pig, 30 minutes after the subcutaneous administration of the different doses of the tested compound. These E.D. 50 showed the doses of compounds protecting 50 percent of the animals against a single lethal dose of histamine.

Owing to their very interesting pharmacological proprieties, new 9-(1-piperazinyl)-9,10-dihydro-9,10-ethanoanthracenes of general formula 1 and their acid addition and quaternary ammonium salts are very useful medicines for human therapeutic, especially as antihistaminics and antianaphylactics. They can thereby be employed in treatment of cutaneous allergic diseases (as for instance urticaria, contact dermatitis, eczema, erythema) allergic rhinitis, allergic asthma, gastritis, and in the treatment of anaphylactic shocks.

The usual dose varies according to the utilized product, the treated patient, the concerned complaint and the selected administration route ; it may be for instance from 2 mg to 250 mg per day, by oral route in human beings.

As medicines new 9-(1-piperazinyl)-9,10-dihydro-9,10-ethanoanthracenes of general formula 1 according to the invention may be employed either in the form of base or in the form of pharmaceutically acceptable acid addition or quaternary ammonium salts. Preference is given among the acid addition salts to those obtained with the following acids:hydrochloric, hydrobromic, hydroiodic, nitric, sulfuric, phosphoric, acetic, maleic, fumaric, succinic, tartaric, citric, benzoic, alkane sulfonics, as also to those obtained with xanthine derivatives containing an acid hydrogen and among the quaternary ammonium salts to those obtained with alkyl halides such as, for instance, methyl chloride bromide and iodide, hydroxy alkyl halides such as for instance the 2-hydroxyethyl chloride, bromide or iodide, alkyl sulfates such as for instance dimethyl sulfate, alkyl-alkane sulfonates or alkyl-arene sulfonates such as methyl-methane sulfonate, methyl-benzene sulfonate or methyl-toluene sulfonate.

The present invention is also concerned with pharmaceutical compositions which comprise as active principles one at least of the compounds of the general formula 1 and/or their acid addition salts and/or the quaternary ammonium salts. These compositions are prepared in order to be administered through digestive, parenteral or local route. They can be solid or liquid ; the pharmaceutical compositions are those usually employed in human medicine, as for example tablets, coated or not, capsules, solutions, syrups, suppositories, parenteral preparations, ointments, creams, gels, aerosols. They are prepared according to usual means. The active principle or principles can be incorporated with excipients which are normally employed in those pharmaceutical compositions, such as for instance, talcum, arabic gum, lactose, starch, magnesium stearate, cocoa butter, aqueous or non aqueous vehicles, animal or vegetal fatty substances, paraffin derivatives, glycols, various wetting dispersing and emulsifying agents and preservatives.

The following non limiting examples illustrate the invention.

EXAMPLE 1 : 9-(4-methyl-1-piperazinyl)-9,10-dihydro-9,10-ethanoanthracene.

A. 9-(4-methyl-1-piperazinyl)-anthracene

Proceeding under nitrogen, 135 g (0,4 mole) of 9,10-dibromo-9,10-dihydro-anthracene were added to a solution of 40 g (0,4 mole) of 1-methylpiperazine and 81 g (0,8 mole) of triethylamine in 400 ml of chloroform. After stirring during 1 hour, the mixture was left during 12 hours at room temperature. The obtained precipitate of triethylamine hydrobromide was collected, the chloroformic solution was washed with water, dried and concentrated. The obtained oily residue was dissolved in toluene ; the toluenic solution was filtered, washed with water, dried and concentrated again. The obtained oily residue was stirred with pentane to give a solid which was separated by filtration. 9-(4-methyl-1-piperazinyl)-anthracene was obtained as yellow crystals. Melting point (after recrystallization from heptane) on a heating stage microscope : 164° C.

| Analysis : | $C_{19}H_{20}N_2$ | |
|---|---|---|
| | C | H |
| Calculated % | 82,6 | 7,3 |
| Found % | 82,6 | 7,4 |

B. 9-(4-methyl-1-piperazinyl)-9,10-dihydro-9,10-ethanoanthracene

A solution of 66 g (0,24 mole) of 9-(4-methyl-1-piperazinyl)-anthracene in 450 ml of toluene was stirred during 30 hours in an autoclave at 200° C under a pressure of ethylene of 120 kg/cm2. After cooling, toluene was driven off by concentration in vacuo, acetone was added to the solid residue which was separated by filtration, and recrystallized from acetone to give 9-(4-methyl-1-piperazinyl)-9,10-dihydro-9,10-ethanoanthracene as creamy white crystals. Melting point on a heating stage microscope : 152° C – 153° C.

| Analysis : | $C_{21}H_{24}N_2$ | | |
|---|---|---|---|
| | C | H | N |
| Calculated % | 82,9 | 7,9 | 9,2 |
| Found % | 82,9 | 8,1 | 9,0 |

EXAMPLE 2 : 9-(4-methyl-1-piperazinyl)-9,10-dihydro-9,10-ethanoanthracene

Operating under nitrogen, 135 g (0,4 mole) of 9,10-dibromo-9,10-dihydro-anthracene were added to a solution of 40 g (0,4 mole) of 1-methylpiperazine and 81 g (0,8 mole) of triethylamine in 400 ml of chloroform. After stirring during one hour, the mixture was left during 12 hours at room temperature. The obtained precipitate of triethylamine hydrobromide was collected. The chloroformic solution was washed with water, dried and concentrated. The obtained oily residue was dissolved in toluene and the obtained solution was filtered, washed with water and dried. Then, this toluenic solution was stirred during 30 hours in an autoclave at a temperature of 200° C and under a pressure of ethylene of 100 kg/cm2. After cooling, an ethanolic hydrochloric acid solution was added to the toluenic solution, the precipitate was collected, washed with ether, dried and stirred with an aqueous diluted solution of sodium hydroxide and the solid compound was collected. 9-(4-methyl-1-piperazinyl)-9,10-dihydro-9,10-ethanoanthracene was obtained which was identical with the compound described in B) of example 1 (creamy white crystals, melting point on a heating stage microscope : 152°C).

EXAMPLE 3 : 9-(4-methyl-1-piperazinyl)-9,10-dihydro-9,10-ethano-anthracene

A. 9-(4-methyl-1-piperazinyl)-anthracene

Operating under nitrogen, 25,7 g (0,1 mole) of 9-bromoanthracene were added to a suspension of lithium-(4-methyl-1-piperazine) obtained by mixing 25 g (0,25 mole) of 1-methylpiperazine and 0,25 mole of phenyllithium in 300 ml of anhydrous ether. 200 ml of anhydrous benzene were added, ether was driven off by distillation and the mixture was boiled under reflux during 12 hours.

Water was added, then the benzenic solution was separated, dried and concentrated. The solid residue was dissolved in diluted hydrochloric acid, the obtained solution was filtered and alkalinized by adding diluted sodium hydroxyde; the obtained precipitate was separated by filtration to give 9-(4-methyl-1-piperazinyl)-anthracene which was identical with the compound described in A of example 1 (yellow crystals, melting point on a heating stage microscope : 164°C).

B. 9-(4-methyl-1-piperazinyl)-9,10-dihydro-9,10-ethanoanthracene

Proceeding as described in B of example 1, 9-(4-methyl-1-piperazinyl)-anthracene above prepared was treated by ethylene, and 9-(4-methyl-1-piperazinyl)-9,10-dihydro-9,10-ethanoanthracene was obtained which was identical with the compound obtained by the process described in B of example 1 (creamy white crystals, melting point on a heating stage microscope : 152°C).

EXAMPLE 4 : 9-(4-methyl-1-piperazinyl)-9,10-dihydro-9,10-ethanoanthracene hydrochloride 0,029 mole of dry ethanolic hydrochloric acid was added to a solution of 8 g (0,029 mole) of 9-(4-methyl-1-piperazinyl)-9,10-dihydro-9,10-ethanoanthracene in 50 ml of absolute ethanol. After cooling the obtained crystals were collected and recrystallized from isopropanol to give 9-(4-methyl-1-piperazinyl)-9,10dihydro-9,10-ethanoanthracene hydrochloride as white crystals. (Melting point on a heating stage microscope : 211°C – 213°C).

Analysis : $C_{21} H_{25} Cl N_2$

|  | C | H | N |
|---|---|---|---|
| Calculated % | 74,0 | 7,4 | 8,2 |
| Found % | 73,9 | 7,4 | 8,4 |

The compound described in this example has formed the subject of a complementary pharmacological study, the results of which were as follows :

1. — L.D. 50 in mice, intravenous route : 69 mg/kg — oral route : 552 mg/kg.
2. — Protection from the histaminic bronchospasm according to Halpern's technique (Arch. Int. Pharmacodyn. 1942, 68, 339-408) consisting of subjecting guinea-pigs to an histaminic aerosol. Results obtained were summarized in the undermentioned table :

| Doses in mg/kg | Protection from an histaminic aerosol at different intervals of time after injection of the tested compound protected/tested | | |
|---|---|---|---|
|  | ½ hour | 3 hours | 24 hours |
| 0,05 |  | 2/8 | 5/9 |
| 0,1 |  | 4/9 | 9/9 |
| 0,2 |  | 3/4 | 4/4 |
| 5,0 |  |  | 4/4 |

3. — Antianaphylactic activity tested according to Giertz and Al's technique (Int. Arch. Allergy 1961, 19, 178-179). Assays were carried out first by sensitizing intraperitoneally guinea-pigs by eggalbumin, then, after three weeks, by injecting subcutaneously the tested compound at different doses and finally, 30 minutes later, injecting again intravenously eggalbumin. It was observed that a dose of 1 mg/kg of the tested compound was sufficient to protect 80 percent of experimented animals.

EXAMPLE 5 : 9-(4-methyl-1-piperazinyl)-9,10-dihydro-9,10-ethanoanthracene methyliodide The solution of 1,5 g (0,005 mole) of 9-(4-methyl-1-piperazinyl)-9,10-dihydro-9,10-ethanoanthracene and of 2 ml of methyl iodide in 30 ml of methylcyanide, was boiled under reflux during 5 minutes. After adding 1 ml of methyl iodide, the obtained mixture was left during 12 hours at room temperature. The obtained crystals were separated by filtration to give 9-(4-methyl-1-piperazinyl)-9,10-dihydro-9,10-ethanoanthracene methyliodide as white crystals. (Melting point on a sealed capillary tube after recrystallization from methanol : 284°C – 285°C).

Analysis : $C_{22} H_{27} I N_2$

|  | C | H | N |
|---|---|---|---|
| Calculated % | 59,2 | 6,1 | 6,3 |
| Found % | 59,3 | 6,3 | 6,1 |

EXAMPLE 6 : 9-[4-(2-hydroxyethyl)-1-piperazinyl]-9,10-dihydro-9,10-ethanoanthracene A. 9-[4-(2-hydroxyethyl)-1-piperazinyl]-anthracene Following the process described in A of example 1 but using 52 g (0,4 mole) of 1-(2-hydroxyethyl) piperazine instead of 1-methylpiperazine, 9-[4-(2-hydroxyethyl)-1-piperazinyl]-anthracene was obtained as yellow crystals. (Melting point on a sealed capillary tube after recrystallization from benzene : 172° C – 173°C).

Analysis : $C_{20} H_{22} N_2 O$

|  | C | H | N |
|---|---|---|---|
| Calculated % | 78,4 | 7,2 | 9,1 |
| Found % | 78,4 | 7,4 | 9,1 |

B. 9-[4-(2-hydroxyethyl)-1-piperazinyl]-9,10-dihydro-9,10-etha-noanthracene

Following the process described in B of example 1, but using 9-[4-(2-hydroxyethyl)-1-piperazinyl]-anthracene instead of 9-(4-methyl-1-piperazinyl)-anthracene the 9-[4-(2-hydroxyethyl)-1-piperazinyl]-9,10-dihydro-9,10-ethanoanthracene was obtained as creamy white crystals. (Melting point on a heating stage microscope after recrystallization from toluene : 197°C – 198°C).

Analysis : $C_{22} H_{26} N_2 O$

|  | C | H | N |
|---|---|---|---|
| Calculated % | 79,0 | 7,8 | 8,4 |
| Found % | 79,2 | 7,9 | 8,4 |

EXAMPLE 7 : 9-[4-(2-hydroxyethyl)-1-piperazinyl]-9,10-dihydro-9,10-ethanoanthracene Operating under nitrogen, 135 g (0,4 mole) of 9,10- dibromo-9,10-dihydro-anthracene were added to a solution of 157 g (1,2 mole) of 1-(2-hydroxyethyl) piperazine in 400 ml of chloroform. After stirring during 1 hour, the mixture was left during 12 hours at room temperature. The obtained 1-(2-hydroxyethyl) piperazine hydrobromide was collected, the chloroformic solution was washed with water, dried and concentrated. The oily residue was dissolved in 400 ml of toluene. The obtained toluenic solution was stirred during 30 hours in an autoclave at a temperature of 200°C and under a pressure of ethylene of 100 kg/cm2. After cooling, the solution was washed with water, dried, added by 4 g of decolorizing carbon, filtered and concentrated. The solid residue was recrystallized from toluene to give 9-[4-(2-hydroxyethyl)-1-piperazinyl]-9,10-dihydro-9,10-ethanoanthracene, which was identical with the compound obtained by the process described in B) of example 6 (creamy white crystals, melting point on a heating stage microscope : 197°C – 198°C).

EXAMPLE 8 : 9-[4-(2-hydroxyethyl)-1-piperazinyl]-9,10-dihydro-9,10-ethanoanthracene hydrochloride Following the process described in example 4 but using 9,7 g (0,029 mole) of 9-[4-(2-hydroxyethyl)-1-piperazinyl]-9,10-dihydro-9,10-ethanoanthracene instead of 9-(4-methyl-1-piperazinyl)-9,10-dihydro-9,10-ethanoanthracene, 9-[4-(2-hydroxy-ethyl)-1-piperazinyl]-9,10-dihydro-9,10-ethanoanthracene hydrochloride was obtained as white crystals. (Melting point on a heating stage microscope : 240°C – 243°C).

| Analysis : | | $C_{22} H_{27} Cl N_2 O$ | | |
|---|---|---|---|---|
| | | C | H | N |
| Calculated | % | 71,2 | 7,3 | 7,6 |
| Found | % | 71,4 | 7,4 | 7,6 |

EXAMPLE 9 : 9-(4-ethoxycarbonyl-1-piperazinyl)-9,10-dihydro-9,10-ethanoanthracene Following the process described in example 2 but using 63,2 g (0,4 mole) of 1-ethoxycarbonylpiperazine instead of 1-methylpiperazine, 9-(4-ethoxycarbonyl-1-piperazinyl)-9,10-dihydro-9,10-ethanoanthracene was obtained as creamy white crystals. (Melting point on a heating stage microscope : 132°C).

| Analysis : | | $C_{23} H_{26} N_2 O_2$ | | |
|---|---|---|---|---|
| | | C | H | N |
| Calculated | % | 76,2 | 7,2 | 7,7 |
| Found | % | 76,3 | 7,3 | 7,8 |

EXAMPLE 10 : 9-(1-piperazinyl)-9,10-dihydro-9,10-ethanoanthracene

The solution of 3,7 g (0,01 mole) of 9-(4-ethoxycarbonyl-1-piperazinyl)-9,10-dihydro-9,10-ethanoanthracene in 50 ml of concentrated hydrochloric acid was boiled under reflux during 4 hours ; 100 ml of water, then 70 ml of concentrated sodium hydroxide were added. The obtained precipitate was collected, dried and recrystallized from heptane. 9-(1-piperazinyl)-9,10-dihydro-9,10-ethanoanthracene was obtained as creamy white crystals. (Melting point on a heating stage microscope : 151°C– 153°C).

| Analysis : | | $C_{20} H_{22} N_2$ | | |
|---|---|---|---|---|
| | | C | H | N |
| Calculated | % | 82,7 | 7,6 | 9,6 |
| Found | % | 82,5 | 7,9 | 9,6 |

EXAMPLE 11 : 9-(1-piperazinyl)-9,10-dihydro-9,10-ethanoanthracene

The solution of 21,4 g (0,0595 mole) of 9-(4-ethoxycarbonyl-1-piperazinyl)-9,10-dihydro-9,10-ethanoanthracene and of 33,6 g (0,595 mole) of potassium hydroxide in 600 ml of ethanol was boiled under reflux during 24 hours. Ethanol was driven off by concentration in vacuo, the residue was treated by 600 ml of water then by chloroform. The chloroformic extracts were dried and concentrated. The thus obtained oily residue was dissolved in a mixture of 200 ml of concentrated hydrochloric acid and of 150ml of ethanol. The obtained solution was boiled under reflux during 15 hours, concentrated to dryness, and alkalinized by adding sodium hydroxide. The obtained precipitate was collected, dried and recrystallized from heptane to give 9-(1-piperazinyl)-9,10-dihydro-9,10-ethanoanthracene which was identical with the compound obtained by the process described in example 10 (creamy white crystals, melting point on a heating stage microscope : 151°C – 153°C).

EXAMPLE 12 : 9-(1-piperazinyl)-9,10-dihydro-9,10-ethanoanthracene hydrochloride

Following the process mentioned in example 4 but using 5 g of 9-(1-piperazinyl)-9,10-dihydro-9,10-ethanoanthracene and 7,5 ml of a 2 N dry hydrochloric acid solution in ethanol, 9-(1-piperazinyl)-9,10-dihydro-9,10-ethanoanthracene hydrochloride was obtained as white crystals. (Melting point in a sealed capillary tube : 272°C).

| Analysis : | | $C_{20} H_{23} Cl N_2$ | | |
|---|---|---|---|---|
| | | C | H | N |
| Calculated | % | 73,5 | 7,1 | 8,6 |
| Found | % | 73,1 | 7,4 | 8,4 |

EXAMPLE 13 : 9-(4-cinnamyl-1-piperazinyl)-9,10-dihydro-9,10-ethanoanthracene

The solution of 13,5 g (0,0462 mole) of 9-(1-piperazinyl)-9,10-dihydro-9,10-ethanoanthracene and of 4,6 g (0,0231 mole) of cinnamylbromide in 200 ml of anhydrous benzene, was boiled under reflux during 48 hours. 9-(1-piperazinyl)-9,10-dihydro-9,10-ethanoanthracene hydrobromide obtained was collected and the benzenic solution was concentrated. The obtained solid residue was recrystallized from heptane to give 9-(4-cinnamyl-1-piperazinyl)-9,10-dihydro-9,10-ethanoanthracene, as creamy white crystals. (Melting point on a heating stage microscope : 177°C – 178°C).

| Analysis : | | $C_{29} H_{30} N_2$ | | |
|---|---|---|---|---|
| | | C | H | N |
| Calculated | % | 85,7 | 7,4 | 6,9 |
| Found | % | 85,5 | 7,5 | 6,8 |

EXAMPLE 14 : 9-(4-cinnamyl-1-piperazinyl)-9,10-dihydro-9,10-ethanoanthracene hydrochloride Following the process described in example 4, but using 12 g of 9-(4-cinnamyl-1-piperazinyl)-9,10-dihydro-9,10-ethanoanthracene, 9-(4-cinnamyl-1-piperazinyl)-9,10dihydro-9,10-ethanoanthracene hydrochloride was obtained as white crystals. (Melting point on a heating stage microscope : 227°C – 231°C).

| Analysis : | | $C_{29} H_{31} Cl N_2$ | | |
|---|---|---|---|---|
| | | C | H | N |
| Calculated | % | 78,6 | 7,1 | 6,3 |
| Found | % | 78,4 | 7,1 | 6,2 |

EXAMPLE 15 : 9-(4-methyl-1-piperazinyl)-9,10-dihydro-9,10-ethano-anthracene 2-hydroxyethyliodide The solution of 3 g (0,01 mole) of 9-(4-methyl-1-piperazinyl)-9,10-dihydro-9,10-ethanoanthracene and of 3 ml of 2-iodoethanol in 30 ml of methylcyanide was boiled under reflux during 2 hours. By cooling crystals of 9-(4-methyl-1-piperazinyl)-9,10-dihydro-9,10-ethanoanthracene 2-hydroxyethyliodide were formed and separated by filtration. (White crystals, melting point on a heating stage microscope after recrystallization from methanol: 276° C).

Analysis: $C_{23}H_{29}IN_2O$

|  |  | C | H | N |
|---|---|---|---|---|
| Calculated | % | 58,0 | 6,1 | 5,9 |
| Found | % | 57,7 | 6,3 | 5,5 |

EXAMPLE 16 : 9-(4-methyl-1-piperazinyl)-9,10-dihydro-9,10-ethano-anthracene 2-hydroxyethylchloride The solution of 3 g (0,01 mole) of 9-(4-methyl-1-piperazinyl)-9,10-dihydro-9,10-ethanoanthracene and of 5 ml of 2-chloroethanol in 50 ml of toluene was boiled under reflux during 48 hours. After cooling, formed crystals were separated by filtration and 9-(4-methyl-1-piperazinyl)-9,10-dihydro-9,10-ethanoanthracene 2-hydroxyethylchloride was obtained as white crystals. (Melting point on a heating stage microscope after recrystallization from methanol : 314° C – 316° C).

Analysis: $C_{23}H_{29}ClN_2O$

|  |  | C | H | N |
|---|---|---|---|---|
| Calculated | % | 71,8 | 7,6 | 7,3 |
| Found | % | 71,7 | 7,6 | 7,2 |

EXAMPLE 17 : 9-(4-methyl-1-piperazinyl)-9,10-dihydro-9,10-ethanoanthracene dimethyl sulfate The solution of 3 g (0,01 mole) of 9-(4-methyl-1-piperazinyl)-9,10-dihydro-9,10C-ethanoanthracene and of 5 ml of dimethyl sulfate in 30 ml of methyl cyanide was boiled under reflux during 2 hours. After cooling obtained crystals of 9-(4-methyl-1-piperazinyl)-9,10-dihydro-9,10-ethanoanthracene dimethyl sulfate were separated by filtration (white crystals, melting point on a heating stage microscope after recrystallization from ethanol : 342° C).

Analysis: $C_{23}H_{30}N_2O_4S$

|  |  | C | H | N |
|---|---|---|---|---|
| Calculated | % | 64,2 | 7,0 | 6,5 |
| Found | % | 64,3 | 7,0 | 6,3 |

EXAMPLE 18

Tablets were prepared which correspond to the formula:

| -9-(4-methyl-1-piperazinyl)-9,10-dihydro-9,10-ethanoanthracene hydrochloride | 25 mg |
|---|---|
| Excipient s.q. for a tablet | 200 mg |

(Excipient can be : lactose, starch, talcum, magnesium stearate).

EXAMPLE 19

A syrup was prepared which corresponds to the formula:

| -9-(4-methyl-1-piperazinyl)-9,10-dihydro-9,10-ethanoanthracene 100 mg | |
|---|---|
| Flavored excipient s.q. for | 100 ml |

EXAMPLE 20

Parenteral preparations were prepared which correspond to the formula:

| -9-(4-methyl-1-piperazinyl)-9,10-dihydro-9,10-ethanoanthracene hydrochloride | 25 mg |
|---|---|
| Aqueous solution | 2 ml |

EXAMPLE 21

An ointment was prepared which corresponds to the formula:

| -9-(4-methyl-1-piperazinyl)-9,10-dihydro-9,10-ethanoanthracene hydrochloride | 2 g |
|---|---|
| Excipient s.q. for | 100 g |

WE CLAIM:

1. A compound selected from the group consisting of 9-(1-piperazinyl)-9,10-dihydro-9,10 ethanoanthracenes and their pharmaceutically acceptable acid addition salts and mono-lower alkyl, hydroxyalkyl and di-lower alkyl quaternary ammonium salts, said 9-(1-piperazinyl)-9,10-dihydro-9,10-ethanoanthracenes having the formula:

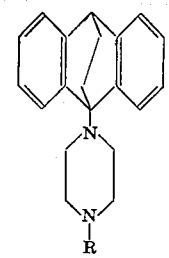

(1)

in which R is a member selected from the group consisting of hydrogen (except when R forms a part of a quaternary ammonium radical), lower alkyl, lower hydroxyalkyl, lower alkoxy carbonyl (except when R forms a part of a quaternary ammonium radical) and — X-phenyl, in which X is selected from the group consisting of lower alkylene and lower alkenylene.

2. A compound selected from the group consisting of 9-(4-methyl-1-piperazinyl)-9,10-dihydro-9,10-ethanoanthracene and its pharmaceutically acceptable acid addition salts and mono lower alkyl and hydroxyalkyl and di lower alkyl quaternary ammonium salts.

* * * * *